WILLIAM E. PALMER
INVENTOR.

Feb. 26, 1963
W. E. PALMER
3,078,710
TENDERNESS TESTING DEVICE
Filed April 27, 1959
3 Sheets-Sheet 2
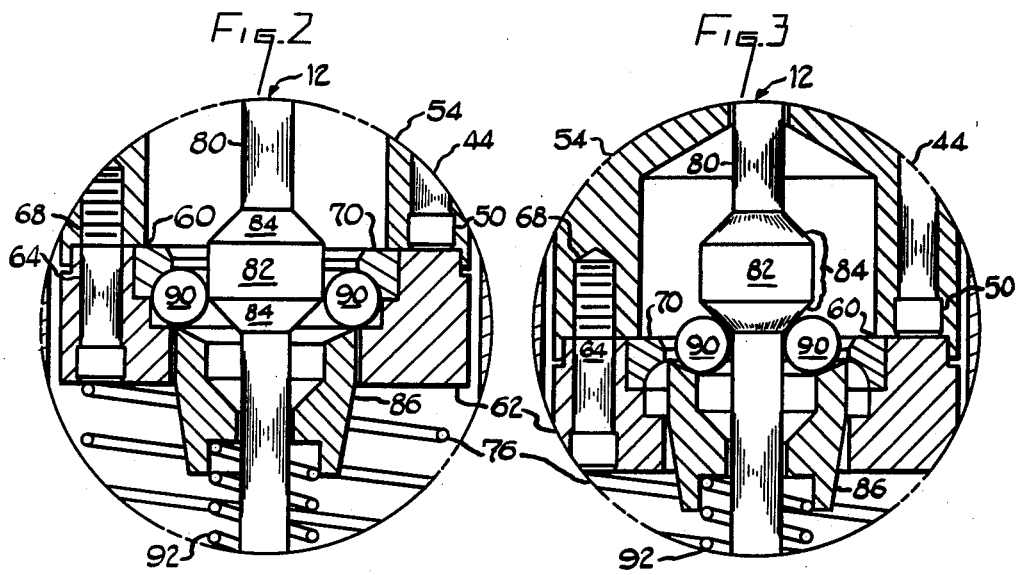
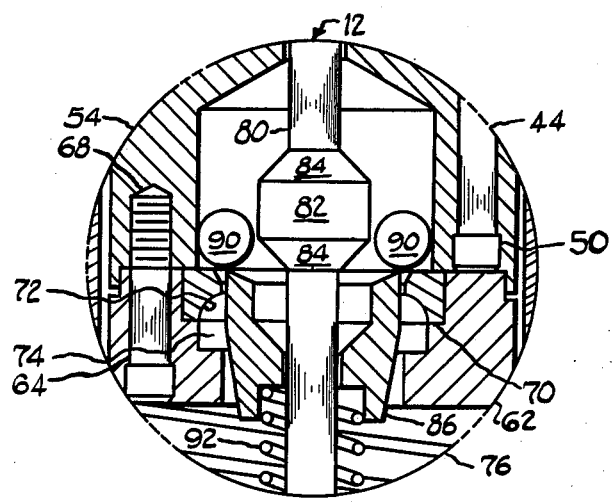
WILLIAM E. PALMER
*INVENTOR.*
BY R.A. Story
*ATTORNEY*

WILLIAM E. PALMER
INVENTOR.

BY R.G. Story
ATTORNEY

United States Patent Office 3,078,710
Patented Feb. 26, 1963

3,078,710
TENDERNESS TESTING DEVICE
William E. Palmer, Downers Grove, Ill., assignor to Swift & Company, Chicago, Ill., a corporation of Illinois
Filed Apr. 27, 1959, Ser. No. 809,061
10 Claims. (Cl. 73—81)

This invention relates to the testing of meat to determine the quality thereof. More specifically, this invention is for a method and apparatus to measure the penetrability and plasticity of samples of meat to determine the relative quality thereof.

It is universally recognized that meat having a desirable characteristic of "tenderness" is neither perfectly elastic nor perfectly plastic; i.e., when the meat is alternately subjected to and released from a penetrating force, such as by chewing, it does not completely resume its original shape nor does it retain the deformed shape. An illustration may be had by noting that meat lacking in tenderness is chewy or tough and tends to spring back to its original shape when masticated; while soft or mushy meat does not spring back at all but, rather, falls apart in the mouth. Both of these extremes are undesirable. The preferred tender quality falls somewhere between these two examples; that is, the meat is neither mushy nor chewy but tends to retain its shape to a certain extent.

In the past, the housewife has performed tests on meat to determine tenderness by either piercing with a sharp instrument, such as a fork, or pressing the meat with the fingers or a spoon or the like. Raw, partially cooked, and fully cooked meat has been thus tested. Actually the housewife has merely been measuring the resistance of the meat to penetration.

Packers and retailers have generally relied upon visual and physical inspection of the meat to judge its quality in view of past experience. Tests similar to those practiced by the housewife have been used. However, there have been few attempts to provide uniform methods and accurate instrumentation to accurately compare and determine the quality of tenderness in meat. All of the instruments and tests, of which I am aware, are based upon the resistance to penetration alone. While the prior methods have been admirable attempts to solve this problem, the fact that they have not been adopted to any appreciable extent indicates that they are either unreliable, impractical, or uneconomical in practice.

Accordingly, it is a principal object of my invention to provide a method and apparatus for accurately determining the quality of meat without damaging any portion thereof.

Another object of my invention is to test meat to determine both its penetrability, or resistance thereto, and its plasticity to thereby judge the tenderness and quality of the meat.

A further object of this invention is to provide a method and apparatus for uniformly testing meat which is simple, accurate, adaptable to the various types of meat, and which may be readily used by either the packer, retailer, or consumer.

An additional object of this invention is to provide a compact, portable apparatus for testing the penetrability and plasticity of samples of meat to thereby determine quality.

Still another object of this invention is to provide a method for accurately measuring the depth to which a given object penetrates a meat sample under a given load and the amount the meat will recover immediately upon said load being released.

Yet another object of this invention is to provide apparatus capable of applying a specific force to an object and recording the distance the object will penetrate into a meat sample when said force is applied.

Additional objects and advantages of the invention will become apparent upon reading the accompanying description taken in conjunction with the drawings wherein:

FIGURE 2 is an enlarged partial detail view of the apparatus of FIGURE 1 showing the relative positions of the parts at the commencement of operation of the device;

FIGURE 3 is a partial detail view similar to FIGURE 2 showing the device at a second stage during operation;

FIGURE 4 is a partial detail view similar to FIGURE 2 showing the device at a third stage during operation;

Briefly, the method of my invention involves a rapid application of force reaching an established load, across a given area of an exposed surface of a meat sample while the surrounding surface of the sample is restrained from displacement. Deformation of the sample while undergoing the application of this force is recorded; and the recovery of the meat from the maximum deformation, which occurs immediately after the force is released, is observed. This data may then be compared with data obtained from control samples and the relative quality of the test sample determined by comparison.

The apparatus I have devised for carrying out this method comprises an indentor plug 10 connected to a calibrated shaft generally 12 mounted in a case generally 14. The case rests upon the surface of the meat sample being tested and serves to confine that surface to a flat plane, preventing deformation upwardly, throughout the test. Only the portion of the sample contacted by the indentor plug 10 will undergo deformation due to a certain established load or force applied to the plug 10. The apparatus includes novel means for applying this force by means of a compression spring, whereby the maximum force applied will always be the established value regardless of the displacement, or amount of indentation, of the plug 10; and releasing the force once the established load has been reached.

Figure 1:
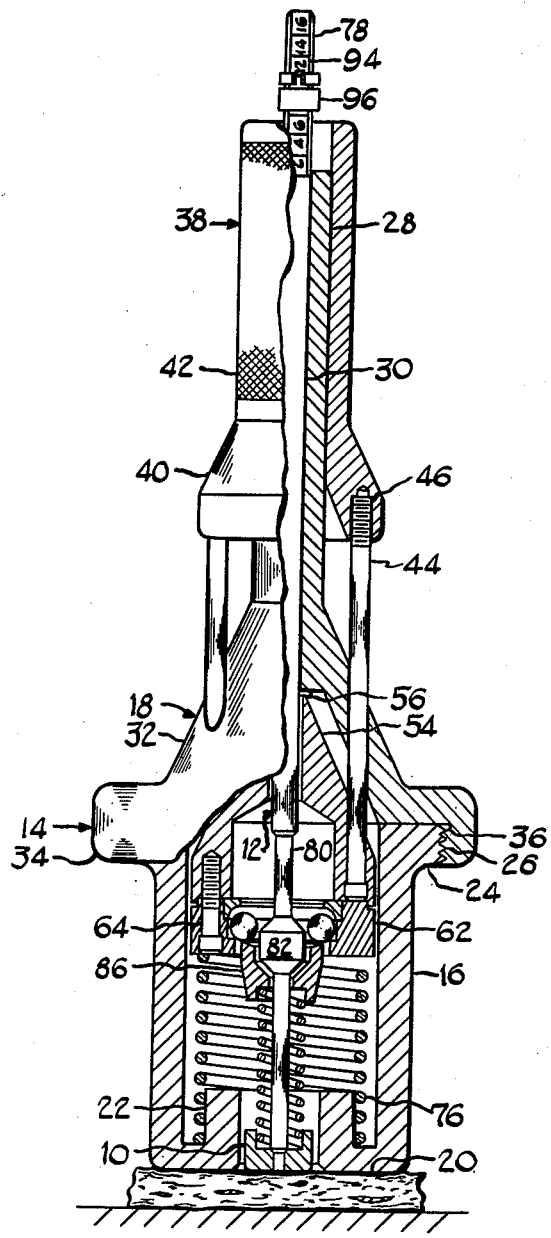
FIGURE 1 is an elevation view of the apparatus of my invention partly in section to better show the elements of the device when at rest.

Referring to FIGURE 1, the case 14 is composed of a lower cylindrical shell 16 and an upper barrel generally 18. The lower shell includes a flat base 20 of relatively large diameter with a guide 22 formed therein defining an opening slightly larger in diameter than the indentor plug 10. The upper end of the cylindrical shell 16 is formed into a flange 24 having threads 26 machined on the external surface thereof. Preferably the indentor plug 10, the opening in guide 22, and case 14 are all circular, although they could assume other convenient shapes.

Barrel 18 comprises an upper cylinder 28 containing a drilled passageway 30, and a hollow tapered section 32 terminating in a lower flange 34 having internal threads 36 engageable with the external threads 26 on the flange 24 of shell 16. The shaft 12 extends from the indentor plug 10, which is disposed in the opening of guide 22 flush with base 20, upwardly through the shell 16 and passageway 30 to above the top of the barrel 18.

Slidably disposed along the upper cylinder 28 of barrel 18 is a concentric sleeve generally 38 having a flared lower portion 40 corresponding generally to the tapered section 32 of the barrel 18. A knurled handle portion 42 of the sleeve 38 is provided as a convenient handgrip for operating the device.

Several long fillister head screws 44 (four in the illustrated embodiment) are secured in tapped holes 46 located in the flared portion 40 and extend downwardly from the sleeve 38. Each screw 44 is threaded only at the end to be secured in hole 46. The screws extend through clearance holes in the tapered section 32 of barrel 18. The head 50 of each screw 44 is suitably received in a countersunk clearance hole drilled in a conical guide bushing 54.

Guide bushing 54 has a substantially hollow interior and is concentric to and slidably mounted about the shaft 12. Bushing 54 is spaced from the interior of barrel 18 by means of a washer 56, seated in a groove on the shaft 12. The groove is located so that the face of indentor 10 is even with the base 20 when the washer 56 contacts the interior of barrel 18.

Directly beneath the guide bushing 54, and abutting a shoulder 60 thereon, is an annular holder 62. The holder 62 is secured to the bushing 54 by means of a plurality of fillister head screws 64 extending through countersunk clearance holes in the holder 62 into tapped holes 68 in the bushing 54. Holder 62 butts against the heads 50 of screws 44 and moves the assembly including bushing 54 when sleeve 38 is reciprocated.

A bearing ring 70, concentric to the shaft 12, is held in place between the shoulder 60 of guide bushing 54 and a shoulder on the annular holder 62. The bearing ring 70 has a concave undersurface 72 coextensive with a raceway 74 on the interior surface of the annular holder 62. Extending between the lower face of the annular holder 62 and the base 20 of cylindrical shell 16 is a compression spring 76. It is unnecessary, and undesirable with a view to disassembly of the device, to fasten the spring 76 to either the annular holder or the base; therefore it is merely seated on the base 20 between guide 22 and the shell 16. As may be determined from FIGURE 1, the spring 76 normally maintains the connected elements including the annular holder 62, guide bushing 54, and sleeve 38 in an elevated position so that the bushing 54 and barrel 18 are separated only by the thickness of washer 56. In practice a spring having a strength of 8 pounds per inch has proven satisfactory.

With reference to the shaft 12, as may be seen in FIGURE 1, an upper portion 78 of the shaft 12, extending to within the hollow guide bushing 54 (when in the elevated position), is of one diameter while a lower portion 80, extending to the indentor plug 10, is of a smaller diameter. However, at about the level of the annular holder 62 there is an expanded section on shaft 12 including a cylindrical body 82 defined by upper and lower tapered faces 84. As will become apparent, the expanded body 82 plays an important part in supplying the selected force to the indentor plug 10.

As seen in FIGURE 1, a spring cap 86 is slidably disposed on shaft 12 just below the expanded body 82. A cavity in the spring cap 86 roughly corresponds to the shape of the lower half of the expanded section 82 of shaft 12. The outer diameter of the spring cap is slightly less than the inner diameter of the bearing ring 70 so that the spring cap 86 may slip therethrough. A plurality of steel ball bearings 90 normally rest on the upper surface of spring cap 86 and are held captive between the shaft 12, bearing ring 70, and the annular holder 62. Five ball bearings have been found sufficient in the actual embodiment, and it is expected that materials other than steel, such as nylon or the like, can be employed. Extending between the spring cap 86 and the indentor plug 10 is a compression spring 92 mounted about the shaft 12 and fitted in seats underneath the spring cap 86 and on the upper surface of the indentor plug 10.

At the upper end of the shaft 12, on that portion normally extending above barrel 18, is a calibrated scale 94. A slide indicator 96 is disposed on the calibrated portion of the shaft 12.

Figure 5:
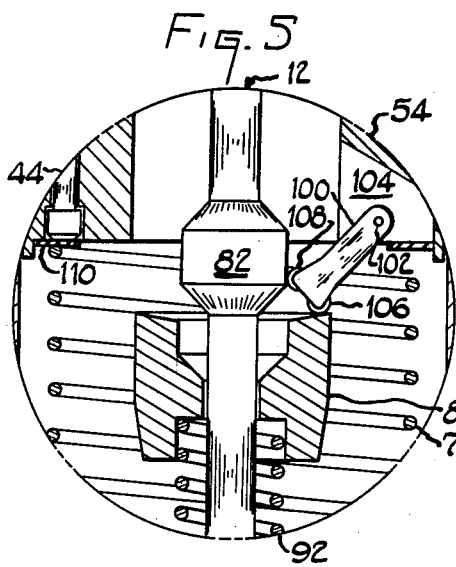
FIGURE 5 is a partial detail view of a device employing a second embodiment of the invention at the commencement of operation.
Figure 6:
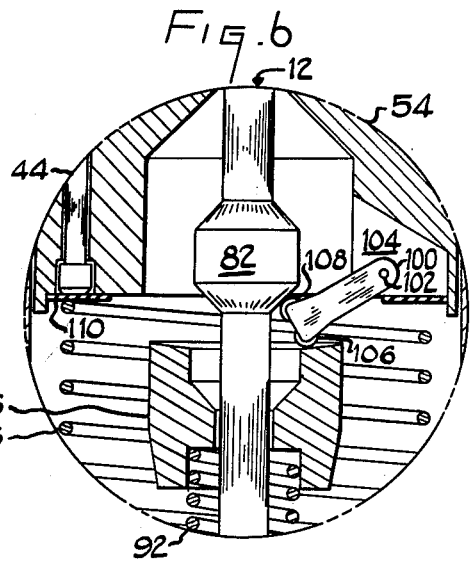
FIGURE 6 is a partial detail view similar to FIGURE 5 showing the device of the second embodiment at a second stage during operation.
Figure 7:
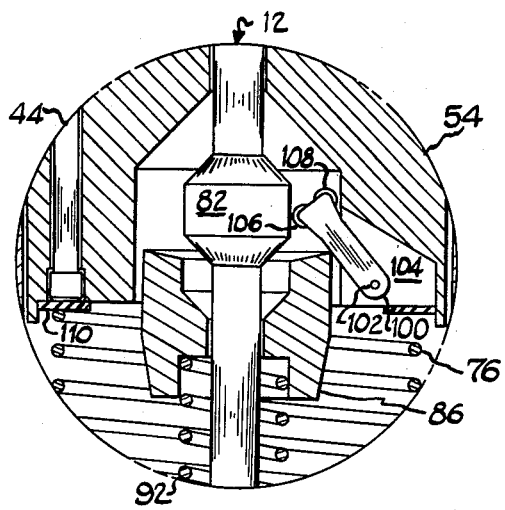
FIGURE 7 is a partial detail view similar to FIGURE 5 showing the device of the second embodiment at a third stage during operation.

The annular holder 62, bearing ring 70, and ball bearings 90 may be omitted and the device somewhat simplified in a second embodiment of the apparatus illustrated in FIGURES 5 through 7. In this embodiment the guide bushing 54 is of a slightly greater height than in the previously described embodiment, and the annular holder 62 is eliminated. A plurality of arms 100 (four have been found sufficient) are pivotally secured by wrist pins 102 within pockets 104 interiorly of the guide bushing 54. Each arm 100 carries a pair of tandem rollers 106, 108, one of which rides on the upper surface of the spring cap 86. The angle through which each arm 100 may pivot is limited by the top surface of pocket 104 and a retaining ring 110 fastened to the undersurface of the bushing 54.

The operation of the first embodiment may best be understood with reference to FIGURES 2, 3, and 4. The operation of the second embodiment will be essentially the same as that of the first and may best be followed with reference to FIGURES 5, 6, and 7. In practice, the operator places the flat base 20 of the device on the upper surface of the sample of meat to be tested. At this point the indentor plug 10 will be flush with the base 20, and the operator will read the scale 94 at the upper edge of the barrel 18 to obtain an initial or zero reading. Slide 96 is then moved down the scale 94 until it is flush against the top of barrel 18.

The operator then manually forces the sleeve 38 downwardly by grasping the knurled handle 42 and pressing against the resistance of spring 76. The force or motion will be transmitted by way of the sleeve 38 and screws 44 to the guide bushing 54 and (in the first embodiment) the annular holder 62 to the compression spring 76. After slight movement downwardly, the apparatus will be in the position illustrated in FIGURE 2. In this position, the ball bearings 90 are held captive between the expanded body 82 of shaft 12, bearing ring 70, raceway 74 of the annular holder 62, and the upper surface of the spring cap 86. Thus it may be seen that, so long as the ball bearings 90 are so confined, force applied to the bushing 54 will be transmitted through the bearing ring 70 and ball bearings 90 to the spring cap 86 and thence through the spring 92 to the indentor plug 10.

The indentor plug is urged against the resistance of the sample of meat with the result that spring 92 will begin to be compressed. So long as the resistance of the meat does not exceed the compressive force of spring 92, both shaft 12 (expanded section 82) and the spring cap 86 will move downwardly at about the same rate. However, as the resistance of the meat exceeds the force of spring 92, the latter will begin to compress with the result that spring cap 86 will move downwardly with respect to the expanded section 82 of shaft 12 and eventually the bushing 54, annular holder 62, and bearing ring 70 will reach a position as illustrated in FIGURE 3.

Spring 92 will have then been compressed a fixed amount resulting in a certain load or force, according to the strength of the spring, being applied to the meat. The clearance between shaft 12 and the inside diameter of bearing ring 70 will have increased to a size allowing the ball bearings 90 to pass therethrough. In effect, the ball bearings 90 will be squeezed out into the hollow interior of bushing 54 thereby removing the structural connection between the bushing and the spring cap 86. Thus the force applied to the upper surface of spring cap 86 will be released. Spring cap 86 will be urged upwardly by spring 92 and pass through the bearing ring 70 (illustrated in FIGURE 4). Thus the force on the indentor plug 10 will be released and it may move upwardly due to the resilient characteristics of the meat sample.

With regard to the second embodiment of the apparatus, it may be seen that the elements cooperate in substantially the same way. As may be seen in FIGURE 5, when pressure is first applied to the sleeve 38, the force is transmitted through the guide bushing 54 to the arms 100 and rollers 106, 108 and thence to spring cap 86. When the bushing 54 first begins to move downwardly (FIGURE 5) the arms 100 are held pivoted downwardly with one roller 106 resting on the top of spring cap 86 and the other roller 108 riding on the expanded section of shaft 12. As bushing 54 is moved downwardly (FIGURE 6), the spring cap 86 will be forced downwardly, thereby compressing spring 92, and the arms 100 will tend to pivot upwardly; however, the latter movement of the arms will be prevented due to the fact that rollers 108 are riding on the surface of the expanded section 82, thus confining the path of arms 100 to a downwardly direction. As the guide bushing 54 is forced still further downwardly, to a point where the rollers 108 pass beneath the expanded section 82, a position will be reached where each arm 100 will be free to pivot upwardly. The pressure exerted by spring cap 86 upwardly against rollers 106 will cause all of the arms to so pivot, swing rollers 108 away from contact with the expanded section 82 of shaft 12 to between that section and the inner wall of bushing 54. Thus the spring cap 86 will be free to move upwardly as in the first described embodiment.

One advantage of the second embodiment is the fact that friction in the device is reduced. In the first embodiment the ball bearings contact three different surfaces, two of which, the bearing ring 70 and the spring cap 86, tend to prevent rotation while the third, the expanded section 82 of shaft 12, tends to cause the ball bearings 90 to rotate. On the other hand, in the second embodiment, only two surfaces, that of the expanded section 82 and the spring cap 86, are involved and each is contacted by separate freely rotatable rollers.

In both embodiments the indentor plug 10 is forced downwardly into the meat, the shaft 12 moves downwardly with respect to the passageway 30 in barrel 18, and the slide 96 will be positioned by the upper edge of the barrel 18 to indicate the maximum depth to which the indentor plug extends. Upon the release of pressure on the spring cap 86, the shaft 12 will again move upwardly and the difference between the maximum depth or penetration of indentor plug 10 and the point to which it is returned by the meat may be read between the top edge of barrel 18 and the lower edge of slide 96.

The force applied to the indentor plug 10 is, of course, dependent upon the distance through which compression spring 92 is deflected by the spring cap 86. This distance is controlled by the length of the expanded section 82 of shaft 12, and it may be seen that once the ball bearings 90 (or rollers 108) have been forced past that section they will be free to move upwardly to thereby release the pressure on top of the spring cap 86. Further, the spring 92 will be compressed the same amount each time the device is operated regardless of how far the indentor plug 10 penetrates into the sample of meat. This is due to the fact that as the indentor plug 10 moves downwardly, carrying the spring 92, the expanded section 82 also moves downwardly the same amount, thus insuring an identical load being placed on the plug 10.

In practice it is believed that successful testing of meat may be had where the indentor plug 10 exerts a pressure at least within the range of about 50 to 350 pounds per square inch on the meat surface. The strength of compression spring 92, the size of the indentor plug 10, and the length of the expanded body 82 of shaft 12 must be selected to provide an adequate pressure on the meat. One version of this invention has been fabricated according to the following specifications:

Spring (92) constant _____ 80 lbs./inch.
Diameter of plug (10) _____ .428 inch.
Effective length of expanded body (82) ___ ⅝ inch.

The maximum pressure exerted on the face of meat samples by this apparatus is about 333 pounds per square inch.

The readings of maximum penetration of the indentor plug and the recovery of the meat, immediately after the load on the indentor plug is released, may be employed to determine the qualities of various cuts of meat. This may best be done after first performing a series of tests to obtain base data for a variety of known samples judged by a panel of experts. Thus, for each type of meat, a range of readings representing qualities of tough to very tender may be established. Thereafter, readings obtained when testing unknown samples may be compared to the readings of known samples and a comparative quality readily determined.

The foregoing description is for the purpose of complying with 35 USC 112, and I do not desire to be limited to the exact details shown and described for obvious modifications will be apparent to those skilled in the art to which this most nearly appertains, and such modifications may be made without departing from the spirit of the invention.

I claim:

1. A method for testing the quality of meat comprising: applying an established pressure across a selected area of the exposed surface of a sample of meat, measuring the depth of indentation of said selected area, fully releasing the pressure on said selected area whereby said surface of the meat may tend to recover its original shape, and measuring the distance said surface recovers upwardly from said indentation.

2. A method for testing the quality of meat comprising: applying pressure gradually and rapidly to a given area of a surface of said meat while flatly confining the surface immediately surrounding said area until a selected pressure is reached, recording the maximum depth of indentation of said surface, fully releasing said pressure immediately upon reaching said selected pressure, and measuring the distance said area of said surface recovers from said maximum depth immediately upon said pressure being released.

3. A method for testing the quality of meat comprising: exposing a suitable surface of said meat, confining a substantial portion of said surface to a flat plane, applying pressure gradually and rapidly to a selected portion of said surface centrally of said substantial portion, releasing said pressure upon reaching a pre-established value, measuring the maximum indentation of said portion of said surface to which said pressure was applied, and measuring the distance said portion of said surface recovers from said maximum indentation immediately upon said pressure being fully released.

4. Apparatus for testing meat comprising: indentor means, means to apply pressure to said indentor means, automatic releasing means for releasing pressure on said indentor means as soon as a determined pressure on said indentor means has been reached, and indicating means for measuring the relative position of said indentor means.

5. Apparatus for testing semiplastic substances such as meat comprising: indentor means, a shaft connected to said indentor means, resilient means for applying pressure to said indentor means, reciprocable means adjacent said resilient means, releasable means normally connecting said reciprocable means and said resilient means, said releasable means disconnecting said reciprocable means and said resilient means when said resilient means is moved a distance sufficient to apply a given force to said indentor, and means to indicate the relative position of said indentor means.

6. Apparatus for testing meat comprising: an indentor, a shaft connected to said indentor, said shaft having an enlarged section spaced above said indentor, a compression spring for applying pressure to said indentor, reciprocable means above said spring, said reciprocable means being substantially concentric with said shaft and movable past said enlarged section thereon, releasable means normally positioned between said enlarged section and said reciprocable means, said releasable means normally connecting said reciprocable means and said spring and releasing said connection when said reciprocable means is moved below said expanded section, and means to indicate the relative position of said indentor.

7. Apparatus for testing the penetrability and plasticity of meat comprising: an indentor, a shaft connected to said indentor, said shaft having an enlarged section spaced above said indentor, a compression spring resting on said indentor concentric about said shaft, a cap on the upper end of said spring normally held adjacent said enlarged section of said shaft, an annular member concentric to said shaft and having an internal opening sufficiently large to pass about said enlarged section and said cap, force transmitting means normally positioned between said cap and said annular member when adjacent said enlarged section to transmit force from said annular member to said cap and spring, said means being releasable from said normal position when moved below said enlarged section of the shaft toward said indentor, and means for applying a force to said annular member.

8. The device of claim 7 wherein the force transmitting means is a plurality of ball bearings.

9. The device of claim 7 wherein the force transmitting means is a plurality of arms pivotally connected to the annular member and having rollers on the ends thereof riding on the enlarged section of the shaft.

10. Apparatus for testing meat comprising: indentor means, means to apply pressure to said indentor means, releasing means for automatic releasing pressure on said indentor means as soon as a predetermined pressure on said indentor means has been reached, and indicating means for measuring and displaying the relative positions of said indentor means both at said predetermined pressure and after said pressure is released.

References Cited in the file of this patent
UNITED STATES PATENTS

| | | |
|---|---|---|
| 2,314,514 | Parsons | Mar. 23, 1943 |
| 2,652,718 | Wiseman | Sept. 22, 1953 |

OTHER REFERENCES

The Compressometer, An Instrument for Evaluating the Thickness, Compressibility, and Compressional Resilience of Textiles and Similar Materials, by F. Schiefer. Bureau of Standards Research Paper RP561. Part of Standards Journal of Research, vol. 10, June 1933 (pages 705 to 713). Copy in Division 36.